Patented Mar. 8, 1932

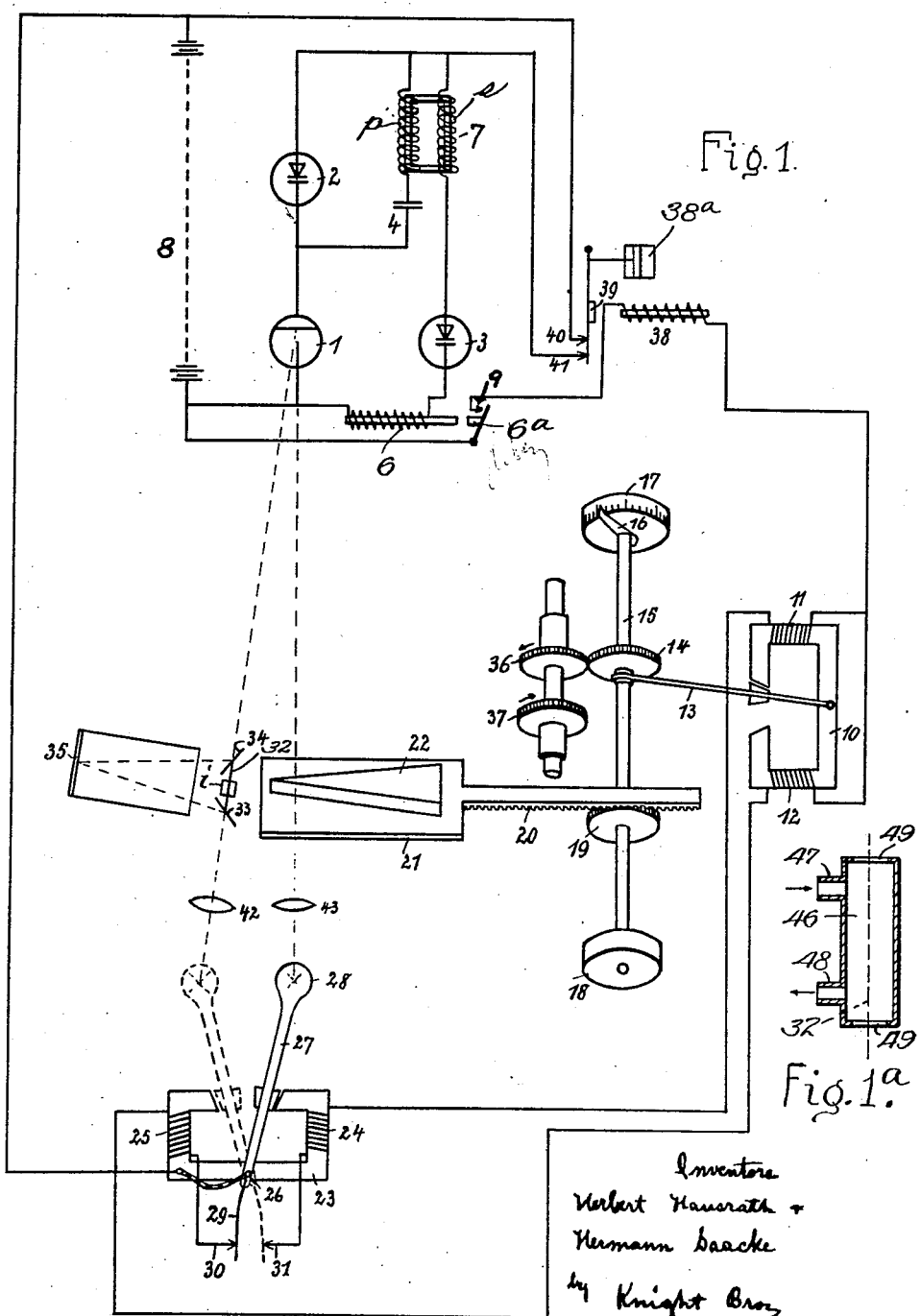

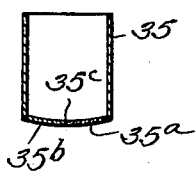
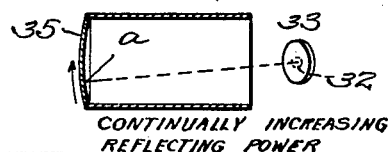
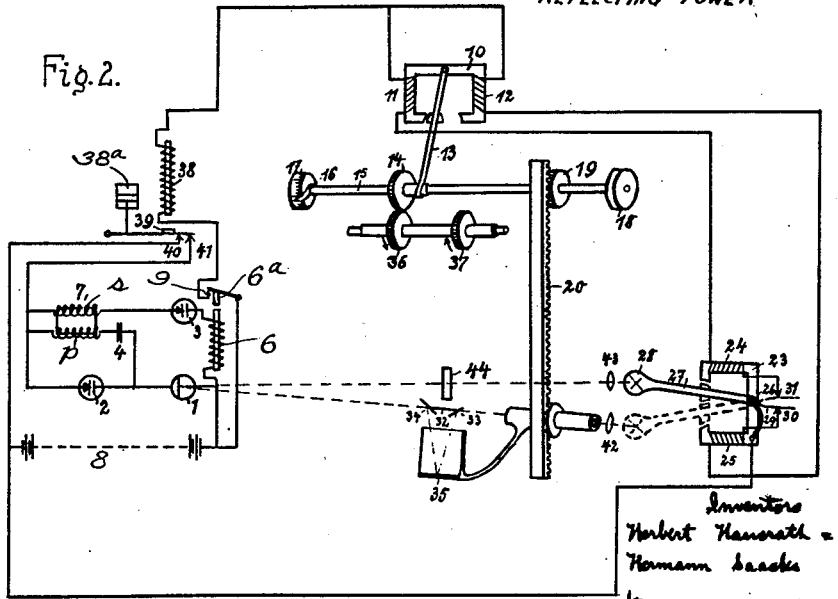

1,848,882

UNITED STATES PATENT OFFICE

HERBERT HAUSRATH, OF DURLACH, NEAR KARLSRUHE, AND HERMANN SAACKE, OF KIEL, GERMANY, ASSIGNORS TO THE FIRM NEUFELDT & KUHNKE BETRIEBS-GESELLSCHAFT M. B. H., OF KIEL, GERMANY

LIGHT ELECTRIC REGULATING DEVICE

Application filed February 7, 1928, Serial No. 252,664, and in Germany February 10, 1927.

The invention refers to such devices which are suitable for indicating a change in observable conditions which themselves, however, do not bring about changes in the conditions. Such devices are for instance sensitive electric measuring instruments, such as, mirror galvanometers, furthermore pyrometers, thermometers, barometers and others. They may also, as it often occurs in the chemical industry, consist of a transparent tube, through which a gas or a liquid is led, the transparency of which is a criterion for its composition or its state.

In all such devices the service conditions are read off on the device itself by the operating staff. Then further action is required by the operating staff, namely to apply the results of the reading to the regulation of the service condition or to transmit the readings to more distant places.

The present invention proposes to dispense with the intermediary of the operating staff for the above-named purposes by providing a contrivance for either regulating the working conditions in accordance with newly changed conditions or capable of transmitting the position of the indicating devices to a distant point if that is required in a particular system.

In order to carry out the idea underlying the present invention, a photo-electric cell is utilized. The intensity of the light beam falling on such a cell is controlled by the device to be observed. Over suitable relay arrangements it releases mechanical forces for regulating a movable element according to the movements of the device to be observed. By this movable element the working condition can then either be directly regulated in the required manner or the transmitter of a long distance indicating device can be actuated, the receiver of which permits the perception of the working condition at any distant place.

A reduction to practice of the invention is represented in the accompanying drawings in which:

Fig. 1 represents a diagrammatic lay-out of the system.

Fig. 1ᵃ represents a modified portion of Fig. 1.

Fig. 1ᵇ represents a side elevation of reflector 35 and mirror 33 in Fig. 1.

Fig. 2 represents a further modified form, and

Fig. 2ᵃ represents a modified form of reflector 35 used in the modification Fig. 2.

In Fig. 1 a photo-electric cell is shown at 1, 2 and 3 are two critical voltage tubes, 4 is a condenser, 6 a relay and 7 a transformer. By "critical voltage tubes" we mean any type of evacuated tube having at least two electrodes, which tube by virtue of its construction permits a uni-directional discharge only at or beyond a critical voltage. Among these tubes may be mentioned for instance cold glow cathode tubes, such as are known in the trade under the name Radiotron model UX—874, but we do not desire to limit the present arrangement to this type of tube. Any tube, having two or more electrodes and having either a cold glow cathode or a heated cathode, which reduces the resistance of the path between the cathode and anode upon the application of a voltage of, or beyond, a critical value for the particular tube and its circuit connection may be employed. 8 is a current source feeding the whole circuit arrangement, 9 is a contact controlled by the relay 6, 10 is a double relay with two windings 11 and 12, the armature 13 of this relay regulating a coupling wheel 14 splined on a shaft 15, on which it can be shifted in axial direction. A hand 16 is fastened to the shaft 15, moving over a scale 17 and furthermore a transmitter 18 of any long distance indicating system is mounted on shaft 15. Finally the shaft 15 carries fixed to it a pinion 19 meshing with a rack 20. This rack operates a translucent wedge 22 mounted on a slide 21, this wedge consisting of a material uniformly pervious to light, so that, on account of the wedge-shape of this body, its perviousness varies proportionately to its movement in longitudinal direction.

23 is a double relay similar to relay 10. It has two windings 24 and 25. Its armature 27 pivoted at 26, carries a source of light 28 at its extremity. At the pivotal end of the armature a contact spring 29 is provided which is connected to the current source 8 and, according to the position of the armature, touches one of the two contacts 30 and 31. 32 is the rotary shaft of the object $i$ whose variations are to be observed, for example the rotary shaft of a delicate voltmeter or galvanometer. At its two ends shaft 32 carries two mirrors 33 and 34 fixed to it and oppositely inclined at about 45° to the direction of the shaft axis.

35 is a fixed cylindrical mirror, whose cylindrical curvature is shown in Fig. 1$^b$, and whose cylindrical axis coincides with the rotary axis of shaft 32, so that a beam of light thrown from lens 42 in the direction of shaft 32 is reflected by way of mirror 33 onto reflector 35 and re-reflected by it and by way of mirror 34 in the original direction as shown by the dash line. It will thus be understood that when the shaft 32 of the measuring instrument rotates as a function of the measuring instrument, the reflected light beam will sweep over the curvature of reflector 35, stopping in accordance with the indicating position in which shaft 32 has come to rest. In other words, for instance point $a$ on the reflector 35, Fig. 1$^b$, at which the beam has come to rest is a measure for the indicating position which instrument shaft 32 has assumed.

Owing to the structural relation of the elements described the light beam in leaving mirror 34 maintains the original axis in which it is supplied from lens 42, no matter at which point shaft 32 has come to rest, respectively no matter where the reflection point $a$ is located on the reflector 35. This reflector has a continuously increasing light reflecting power, which is indicated in Fig. 1$^b$ by the curved arrow, so that the further point $a$ is located in the direction of this arrow the more light of the original beam will be reflected onto mirror 34 and emanate from the latter. A reflector with such varying light reflecting power can be made for instance by polishing successive surface portions between its two ends from a rough, non-reflecting condition at one end to a higher and higher degree, until a highly reflecting condition exists at or near the other end. In other words, the several surface portions between its ends are imparted with successively different light absorbing properties, varying from substantially full absorption to substantially full reflection of the light.

36 and 37 are two gear wheels rotating continuously in opposite direction. They are continuously driven by any suitable source of power for instance an electric motor not shown.

38 is a relay with retarded action (due to dash pot 38$^a$), the armature 39 of which relay closes the two contacts 40 and 41 in deenergized condition. 42 and 43 are two optical lens systems suitably designed to act as condensers for the light emanating from the lamp 38 to concentrate the light into beams shown in dash lines.

The above described arrangement operates as follows: Let it be assumed that measuring instrument shaft 32 has assumed a certain indicating position, so that in case a light beam is thrown from lens 42 towards cell 1 it is reflected by reflector 35 at the point $a$ of its surface (Fig. 1$^b$). Let it be further assumed that the lamp 28 has just occupied the position shown in full lines. The light beam emanating from the lamp now falls through the translucent wedge 22 onto the photo-electric cell. Consequently, a current flows from battery 8 over the cell, condenser 4, left coil of transformer 7, contacts 41, 40 now closed, back to battery 8, thereby gradually charging the condenser 4. As soon as the condenser 4 is sufficiently charged and has reached the critical voltage for tube 2, it discharges by way of this tube. This discharge current rush flows through the primary windings $p$ of the transformer 7 and a corresponding current is induced in the secondary windings $s$. This current is directed the same as that delivered by battery 8, its voltage being thus added to that of battery 8, the combined voltages being strong enough to send a current through valve 3 and through relay 6, which attracts its armature 6$^a$, thereby closing contact 9. This permits a current to flow from the battery 8 over the contact 9, through the coil of retarded relay 38, coil 12 of relay 10, coil 25 of relay 23, contact 30 and contact spring 29 back to battery 8. The armature 13 of relay 10 is drawn down by the core end which carries coil 12 and consequently the gear wheels 14 and 36 are thrown out of mesh and gear wheels 14 and 37 brought into mesh. Over the drive 19 and 20 the translucent wedge 22 commences travelling to the left and consequently the light beam intensity from lamp 28 through wedge 22 and thus its action upon the photo cell 1 is decreased. Simultaneously with the movement of the relay armature 13, the relay armature 27 of relay 23 has also altered its position and has been thrown over into its left hand position shown in dotted lines. Consequently, the light beam now strikes the photo-electric cell 1 through condenser lens 42 over mirror 33, assumed point $a$ of reflector 35 (Fig. 1$^b$) and mirror 34. At the same time the contact spring 29 has now made contact at 31. In the meantime the retarded armature 39 of relay 38 acts and breaks the connection between the two contacts 40 and 41, so that the current from battery 8 through critical voltage tube 3 is interrupted. Consequently relay 6 is de-energized and contact 9 controlled by it is opened. Translucent wedge 22 continues being displaced towards the left as described before until the condenser 4 is again sufficiently charged over the cell 1, to discharge over tube 2. Now the occurrences already described above with respect to transformer 7 and tube 3 are repeated with the difference, however, that now the winding 11 of relay 10 and winding 24 of relay 23 are energized, so that gear wheel 14 is shifted out of mesh with wheel 37 and back into mesh with wheel 36 and the relay armature 27 with its lamp 28 is thrown back into its right hand position sending the light beam again through wedge 22, which is now travelling to the right. These occurrences are continually repeated and result in an adjustment of the translucent wedge 22 into a position in which, when traversed by a beam of light from lamp 28, it has the same light absorption as the point a of reflector 35.

If the light absorption of the point a of the reflector 35 struck by the light beam is less than that of the part of wedge 22, traversed at the prevailing wedge adjustment, the period during which the wedge is displaced towards the left becomes longer than the displacement period towards the right, so that after every complete left-right cycle of displacement of the wedge, a difference remains by which the wedge has moved further towards the left. If the absorption of the particular reflector point is greater, a difference will remain by which the wedge has moved further to the right. If, however, the light absorption of the point a of the reflector 35 and of the portion of wedge 22 traversed by the light beam are of the same value, the movement amplitudes of the wedge in both directions are the same, so that the wedge 22 reciprocates about a central position which is a measure for the position of the mirrors 33 and 34 with respect to the arc of reflector 35 over which they sweep. The degree of uniformity of the motion amplitude of wedge 22 in both directions can be readily read off on scale 17, since hand 16 revolves with shaft 15.

In the arrangement shown as example in Fig. 1 the light absorption of the different points on reflector 35 onto which the beam has been thrown by the mirrors 33 and 34 is compared with the light absorption of particular portions of the wedge 22, respectively the wedge is displaced until the portions of equal absorption are found. A similar arrangement can be applied in cases where the perviousness of gases or liquids forms a measure for their condition. In such cases the mirrors 33 and 34 and reflector 35 are replaced by a tube 46 shown in Fig. 1ª. This tube is closed at both ends by glass plates 49 through which the light beam can pass in the direction 32 (Fig. 1), and laterally inlet 47 and outlet 48 are provided by which the fluid under investigation is forced through tube 46. The translucent wedge 22 is here shifted back and forth in the manner described, until its light absorption corresponds with the absorption of the light by the fluid to be tested. Consequently, the position of the wedge forms a measure for the perviousness of the medium to be tested and this wedge position can, therefore, be locally read at 17 or be transmitted to any distant point for observation by any suitable means known in the art, or the different wedge position may be employed for the regulation of a working occurrence concerning the fluid.

Another form of reduction of this invention to practice is represented in Fig. 2. In this figure all parts shown correspond to Fig. 1 with the exception of the following modification:

The displaceable translucent wedge 22 has been dispensed with. In its place a fixed body 44 of constant light absorbing capacity is substituted. The reflector 35 with its increasing light reflecting surface is no longer fixed like in Fig. 1, but pivotally arranged to rotate about the rotation axis of instrument shaft 32, and it is directly geared to the driving wheel 19 by the extended rack 20 which in Fig. 1 operates wedge 22. The thus modified arrangement works as follows:

Similarly to the modification shown in Fig. 1 the photo-electric cell 1 is alternatively illuminated over the reflector 35 and the comparison body 44. Consequently, the reflector 35 makes reciprocating movements like wedge 22 in Fig. 1. As the perviousness of the part 44 is invariable, the reflector 35 is adjusted by the gearing described so that the reflecting point a (Fig. 1ᵇ) for the light beam is finally located at a point of the reflector 35 which has the same light absorption as body 44. If the instrument shaft 32 with mirrors 33 and 34 should move into another position, thereby moving the reflecting point of the beam to another position on reflector 35, the reflector will follow until it has brought the aforementioned point of similar light absorption to the newly adjusted reflecting point. Thus the position of reflector 35 becomes a measure for the positions of instrument shaft 32, which positions may be read off on scale 17 or transmitted to distant points by any suitable means known in the art. Otherwise the function of the whole arrangement is exactly the same as that according to Fig. 1. It represents merely a simplification inasmuch as no longer two bodies of decreasing absorption power, but only one is necessary.

This remaining body of continually increasing absorbing power represented in Fig. 2 by reflector 35 can also be dispensed within this arrangement, if the cylinder surface of reflector 35 is made of two parts, one of which has an absorbing power of nearly nought, while the absorbing power of the other part is practically total the meeting line of both parts being parallel to the axis of rotation of shaft 32, respectively of reflector 35. This reflector form is indicated in Fig. 2ª, where for instance 35ª may indicate the highly reflecting portion and 35ᵇ the practically totally absorbing portion. The meeting line is indicated at 35ᶜ. With the operation of the arrangement previously described with reference to Fig. 2, this modified reflector is finally adjusted in Fig. 2 by the regulating device so that the light beam is thrown just on the meeting line 35ᶜ between both reflector parts 35ª and 35ᵇ. According to whether the comparison body 44 absorbs more or less light, the light beam will enclose the greater part of the absorbing respectively of the light reflecting part of the reflector. The arrangement, therefore, makes possible the substitution of the reflector Fig. 2ª for the reflector 35 of continually variable absorbing power shown in Fig. 2 which is relatively difficult to construct, and permits the operation with a combination of reflecting and dimmed surfaces.

In the above-described constructive examples only some characteristic forms of the practical application of the invention are represented. Naturally the individual operating elements of the arrangement, merely shown as examples, may easily be replaced by well known equivalents. For instance, the two electrode valves 2 and 3 connected in cascade may be replaced by three electrode valves. In the latter case the voltage applied to the grid electrode of a three electrode valve can be varied by the current passing through the photo-electric cell until the valve acts. In using valves of this type, advantage may also be taken of their behavior when used near the bend in their characteristic curve.

Furthermore, the gearing arrangement shown for operating the wedge in Fig. 1 and the reflector in Fig. 2 may be replaced by any other equivalent gearing which produces the result described.

We claim:—

1. In a device for indicating the varying conditions of a variable element, comprising a beam source of light, a photo-electric cell disposed to encounter said beam, a reflector having a cylindrical surface of decreasing light absorption qualities along a given direction, a mirror system for reflecting the light beam from said source by way of said reflector to said cell, said mirror system being fixed to said variable element to vary the reflecting point upon said reflector, thereby striking reflecting points of varying light absorption in accordance with the variations of said variable element, control circuits including said cell, a current source, critical voltage tubes and current operated means actuated in accordance with the varying intensities of the beam striking said cell, and a translucent wedge having continuously decreasing light absorbing power in the direction of its inclination, means controlled by said current operated means for alternately directing said light beam to the cell through said wedge and by way of said reflector, reversible gearing controlled by said current operated means for shifting said wedge to decrease or increase the light intensity of the beam directed through the wedge upon said cell in accordance with the decreased or increased beam intensity directed by way of the reflector upon said cell to equalize the light intensities of the alternately directed beams, and means for indicating the wedge positions, to indicate the extent to which said variable element has varied.

2. In a device for indicating the varying conditions of a variable element, comprising a beam source of light, a photo-electric cell disposed to encounter said beam, a reflector having a cylindrical surface of decreasing light absorption qualities along a given direction, a mirror system for reflecting the light beam from said source by way of said reflector to said cell, said mirror system being fixed to said variable element to vary the reflecting point upon said reflector, thereby striking reflecting points of varying light absorption in accordance with the variations of said variable element, control circuits including said cell, a current source, critical voltage tubes and current operated means actuated in accordance with the varying intensities of the beam striking said cell, and a translucent body and means controlled by said current operated means for alternately directing said light beam to said cell through said body and by way of said reflector, reversible gearing controlled by said current operated means for moving said reflector from its previous position to decrease or increase the light intensity of the beam reflected by it according to whether the reflecting point was previously moved by said variable element to a point on the reflector of smaller or greater light absorption than that of said body to equalize the beam absorption by the reflector and said body and the beam action upon the cell, and means for indicating the different reflector positions to indicate the extent to which said variable element has varied from a previous position.

3. In a device for indicating the varying conditions of a variable element, comprising a beam source of light and a photo-electric cell disposed to encounter the light beam, means for guiding said beam by way of said variable element to vary the light intensity of said beam in accordance with its own variations, control circuits including said cell, a current source, critical voltage tubes and current operated means actuated in accordance with the varying intensities of the light striking the cell, and additional movable guiding means for said beam, controlled by said current operated means, and having means for varying its light permeability in accordance with said varying light intensities of the beam striking said cell, and means connected with said additional guiding means for indicating the extent to which said variable element has varied.

4. In a device for indicating the varying conditions of a variable element, comprising a beam source of light, a photo-electric cell and means for guiding said beam onto said cell, means controlled by said variable element for varying the intensity of the light guided onto said cell, a second means for guiding a beam from said source to said cell and having means for varying the intensity of the light so guided, control circuits including said cell, a current source, critical voltage tubes and current operated means for actuating one of said guiding means to vary its position with respect to the light beam in accordance with the light response of said cell, to adjust said actuated guiding means into a position corresponding with the varied condition of said variable element, and means for indicating the adjusted position of said actuated guiding means.

5. In a device for indicating the varying conditions of a variable element, comprising a beam source of light, a photo-electric cell and a reflector serving as a guiding element for said beam to said cell, said reflector having different light absorption qualities on different portions of its surface, a mirror system for reflecting the beam from said source by way of said reflector to said cell, said mirror system being fixed to said variable element to direct the light to different parts of said reflector in accordance with the different positions which said variable element assumes, a second, translucent guiding element for said beam to said cell, for varying the intensity of the light so guided, control circuits including said cell, a current source, critical voltage tubes and current operated means actuated in accordance with the varying intensities of the light reflected upon said cell, one of said guiding elements being movable and controlled by said current operated means to vary its position with respect to the light beam in accordance with said varying light intensities, produced by the reflected light striking different portions of different absorption qualities on said reflector, said movable guiding element having indicating means to give an indication of the extent to which said variable element has varied.

In testimony whereof we affix our signatures.

HERBERT HAUSRATH.
HERMANN SAACKE.